United States Patent [19]
Abbe et al.

[11] Patent Number: 4,849,916
[45] Date of Patent: Jul. 18, 1989

[54] IMPROVED SPATIAL RESOLUTION MEASUREMENT SYSTEM AND METHOD

[75] Inventors: Robert C. Abbe, Newton; Neil H. Judell, Jamaica Plain; Noel S. Poduje, Needham Heights, all of Mass.

[73] Assignee: Ade Corporation, Newton, Mass.

[21] Appl. No.: 729,166

[22] Filed: Apr. 30, 1985

[51] Int. Cl.$^4$ .................. G01B 5/28; G01R 29/26
[52] U.S. Cl. .................. 364/563; 364/560; 73/105; 324/60 C; 324/61 P
[58] Field of Search ............ 364/563, 560; 324/60 C, 324/61 R, 61 P, 60 QS; 356/371; 73/104, 105

[56] References Cited

U.S. PATENT DOCUMENTS

| | | | |
|---|---|---|---|
| 3,805,150 | 4/1974 | Abbe | 324/61 R |
| 3,899,832 | 8/1975 | Hunyar | 33/552 |
| 3,990,005 | 11/1976 | Abbe et al. | 324/61 R |
| 4,158,171 | 6/1979 | Abbe et al. | 324/61 R |
| 4,217,542 | 8/1980 | Abbe et al. | 324/61 R |
| 4,300,226 | 11/1981 | Barnette et al. | 324/61 QS |
| 4,330,213 | 5/1982 | Kleinknecht et al. | 364/563 |
| 4,457,664 | 7/1984 | Judell et al. | 414/729 |
| 4,560,924 | 12/1985 | Nordborg | 324/61 R |
| 4,623,975 | 11/1986 | Kagami | 364/560 |
| 4,633,420 | 12/1986 | Masanobu | 364/563 |

*Primary Examiner*—Parshotam S. Lall
*Assistant Examiner*—Joseph L. Dixon
*Attorney, Agent, or Firm*—Weingarten, Schurgin, Gagnebin & Hayes

[57] ABSTRACT

The present invention discloses means and method for obtaining an increased spacial resolution from a sensor that includes a probe having a characteristic physical dimension that limits its spacial resolution. Such a probe may include a rectangular sensing surface wherein the probe sensitivity increases with surface area while the spacial resolution decreases with increasing surface area. The probe and an object to be measured are controllably moved relatively to each other in such a way as to define preselected increments of relative movement that are selected to be a fraction of the characteristic physical dimension of the probe. Data is collected at each of the increments that is representative of a preselected characteristic of the object to be measured with a spacial resolution that is determined by the characteristic probe dimension and the data is digitally filtered to provide processed data representative thereof having a spacial resolution that is determined by the fractional increment of relative motion. In a preferred embodiment, the object measurement system and method of the instant invention has exemplary utility in a wafer profiling station having a capacitive sensor and operable to provide thickness data for regions of the wafer located within one probe-width of its edge. The capacitive sensor includes two capacitive probes each having a generally-rectangular sensing element that is surrounded by a generally-rectangular guard.

27 Claims, 3 Drawing Sheets

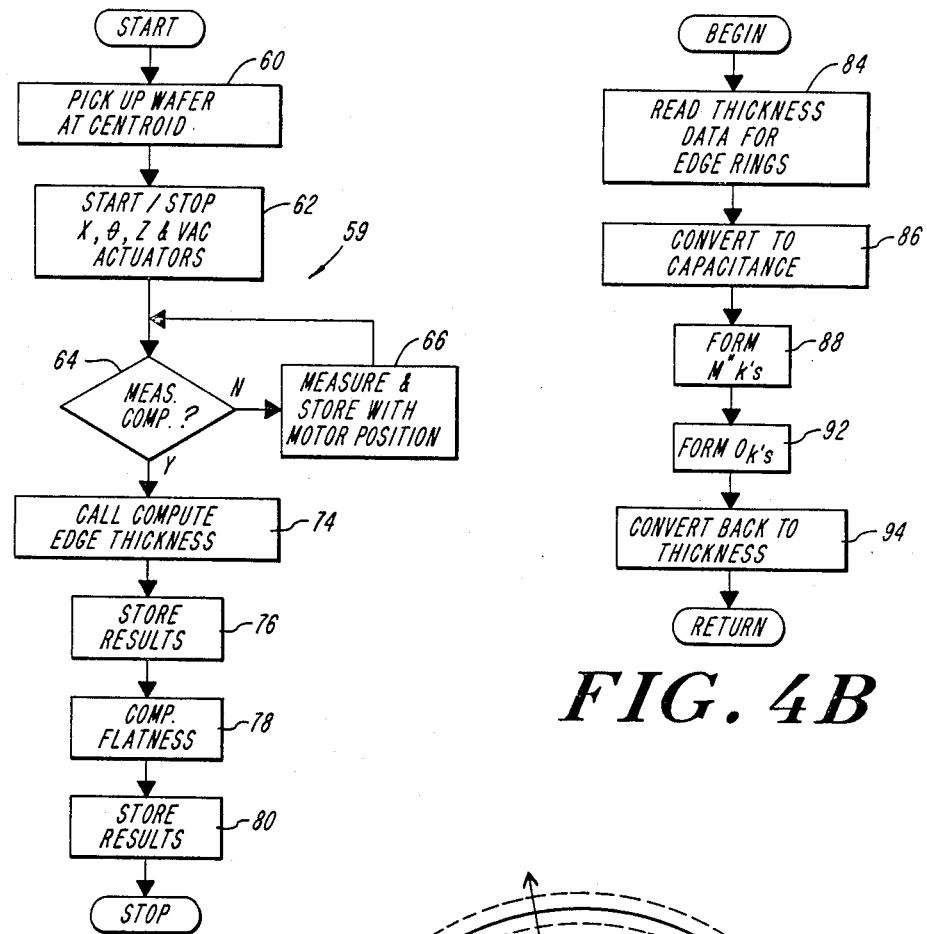
*FIG. 4A*
*FIG. 4B*
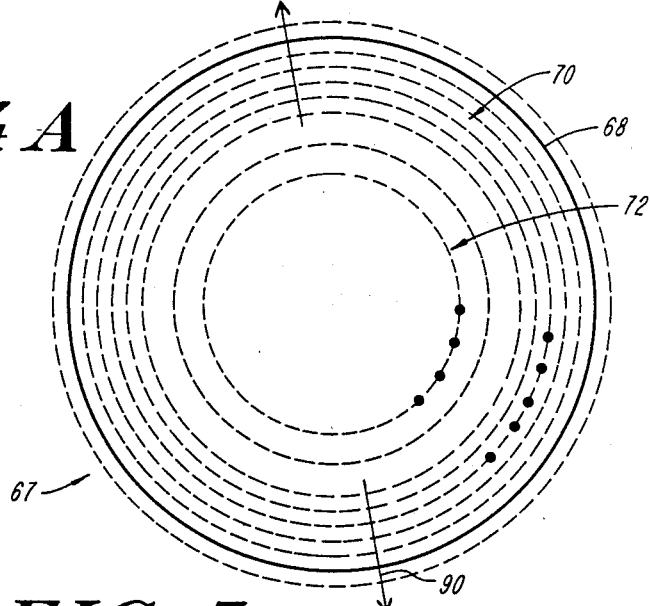
*FIG. 5*

IMPROVED SPATIAL RESOLUTION MEASUREMENT SYSTEM AND METHOD

FIELD OF THE INVENTION

This invention is directed to the field of measurement and testing, and more particularly, to a novel object measurement system and method.

BACKGROUND OF THE INVENTION

Many types of probes have a surface region forming the active sensing area. Typical of such probes are capacitive, optical, electromagnetic, and acoustical probes to name a few. The surface region determines at least partly the probes sensitivity and spatial resolution. As the sensing area increases, so does sensitivity but at the expense of spatial resolution. For many applications it is desirable to have the high sensitivity advantage of a large sensing area but with a spatial resolution corresponding to a much smaller sensing area.

Many applications such as the semiconductor wafer quality control and production processes call for accurate and reliable data representative of a preselected characteristic of an object such as the thickness and flatness of one or more semiconductor wafers. The novel Wafer Flatness Station disclosed in co-pending utility patent application Ser. No. 572,695, invented by the same inventive entity and assigned to the same assignee as the instant invention, incorporated herein by reference, for example, includes a capacitive sensing head, and means including an actuator associated therewith that are co-operative to sequentially measure the thickness of preselected points of a semiconductor wafer, and to automatically provide data in response thereto that is representative of the flatness of the wafer. The capacitive sensing head includes at least one probe the spatial resolution of which is determined by its characteristic physical dimension. In regions of the object to be tested remote from its actual physical boundaries, such as for the thickness sensing of semiconductor wafers at points thereof that are remote from its edge, such a head is operative to provide highly accurate and reliable data. The confidence level of the data is limited, however, for those points located adjacent to the physical boundaries of the object that are within a characteristic physical dimension of its boundaries, such as wafer points located within a probe width of the edge of the wafer. One known technique to improve the confidence-level for such data points is to actually reduce the characteristic physical dimension of the probe. This technique is disadvantageous, however, due to the difficulty in and associated costs for manufacturing miniature probes, and due to the reduced signal-to-noise levels characteristicly produced by such miniature probes, among other things.

SUMMARY OF THE INVENTION

The object measurement system and method of the instant invention makes possible measurements with a probe having a physical dimension "N", characteristic of the probe's sensing area, as if the measurements were made by a probe having a characteristic physical dimension "n", where "n" is a small fraction of the characteristic physical dimension "N" of the probe. The present invention in this manner is capable of providing data with a comparatively-large probe that has a spacial resolution and a confidence level that heretofore has only been available with a comparatively much-smaller probe but without suffering from any of its attendant disadvantages including lessened sensitivity.

In accordance with the present invention, a probe and an object having an associated identifiable characteristic to be measured are linearly moved relative to each other in increments "n" that individually are a fraction of the characteristic physical dimension, "N", of the probe. The probe for each increment provides data representative of the preselected characteristic of the object with a spatial resolution determined by its characteristic physical dimension "N". Means coupled to the probe including a processor are disclosed for digitally filtering the data to provide processed data representative of the preselected characteristic associated with the object with a spatial resolution determined only by the size of the increment "n" of the relative motion.

In an exemplary embodiment, the object measurement system and method of the present invention has disclosed utility in a wafer profiling station where it is advantageously embodied to provide highly accurate and reliable data of the thickness of a semiconductor wafer for points of the wafer located in regions thereof defined within a probe-width of its edge. In a presently preferred embodiment thereof, a capacitive sensor is provided that includes spaced, upper and lower capacitive probes each having a generally rectangular cross-section and each having a generally rectangular guard portion therearound. A wafer to be profiled is mounted to an X, Theta, and Z moveable vacuum chuck, and predetermined ones of preselected points thereof that are located within a probewidth of its edge are moved into the capacitive sensor by controlled increments that define an integral sub-multiple of the width of the rectangular probes. The corresponding measurements are converted into digital form and stored in a data table at address locations thereof that correspond to the radial and angular coordinates of individual ones of the points. The data is digitally filtered to provide a thickness profile of the edge of the wafer with a spatial resolution that is an integral multiple of the resolution of the rectangular probes, thereby providing a high confidence level for those points of the wafer that are located within a probe width of its edge.

BRIEF DESCRIPTION OF THE DRAWINGS

Other advantages and features of the present invention will become apparent as the invention becomes better understood by referring to the following solely exemplary and non-limiting detailed description of an exemplary embodiment thereof, and to the drawings, wherein:

FIG. 4 illustrates in FIG. 4A and in FIG. 4B flow charts useful in explaining the processing steps of the wafer profiling station embodying the object measure- FIG. 5 is a pictorial diagram illustrating a preferred data collection pattern of the wafer profiling station embodying the object measurement system and method according to the present invention;

DETAILED DESCRIPTION OF AN EXEMPLARY EMBODIMENT

Figure 7:
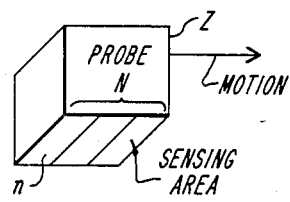
FIG. 7 is a pictorial diagram of a probe having a sensing area useful in explaining the object measurement system and method of the instant invention.
Figure 8:
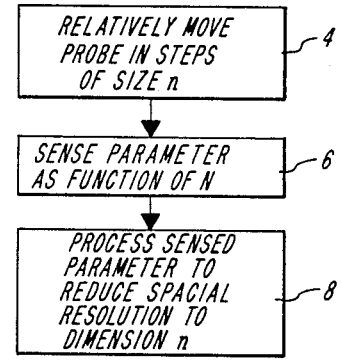
FIG. 8 is a block diagram useful in illustrating the principles of the object measurement system and method of the instant invention.

Briefly and in general terms corresponding to FIGS. 7 and 8, the object measurement system and method of the present invention contemplates a sensing head having at least one probe of which a physical dimension "N" is characteristic of the probes sensing area for measuring a preselected parameter. The system contemplates controlled relative motion (step 4) of the at least one probe and an object in a manner to detect (step 6) the parameter in increments, "n", that are a fraction of the characteristic physical dimension, "N", of the probe, to provide data representative of the parameter with a spatial resolution determined by the characteristic physical dimension "N" of the probe. The system further contemplates signal processing (step 8) operative in response to the data measured at successive ones of the incremental movements to provide processed data representative of the parameter with a spatial resolution that is determined by the increment size "n". It will thus be appreciated that the measurement system and method of the present invention is useful in many applications where it is desirable to provide data with an increased spatial resolution from an actual sensing head having a characteristic physical dimension as if it were provided by a sensing head having a characteristic physical dimension that is a fraction of the characteristic physical dimension of the actual probe used. Such applications may include in the semiconductor wafer quality control and production industry warp determinations of semiconductor wafers, flatness determinations of semiconductor wafers, and translation location determinations of semiconductor wafer, although in general the present invention may be used in any application where it is desirable to provide an improved spatial resolution capability from a sensing head without changing the physical dimensions of the probe. In exemplary embodiment, a capacitive sensor to be described is disclosed. The present invention is not limited to capacitive sensors but contemplates any sensor including the optical and the electromagnetic where it is possible to linearly sum its spacial sensitivity.

Figure 1:
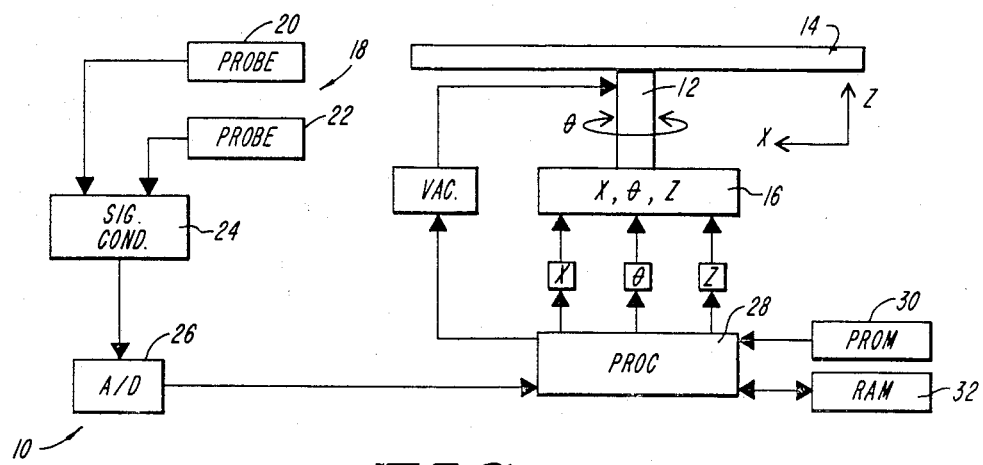
FIG. 1 is a block diagram of a wafer profiling station embodying the object measurement system and method according to the present invention.

In exemplary embodiment and referring now to FIG. 1, generally designated at 10 is a not-to-scale block diagram of a wafer profiling station embodying the object measurement system and method according to the present invention. The system 10 includes a vacuum chuck 12 which releasably grips a wafer 14 to be thickness profiled. An X, Theta, and Z actuator assembly 16 is coupled to the chuck 12 and is responsive to X, Theta, and Z control signals to be described to controllably translate and rotate the wafer 12 in a manner to be described.

A capacitive sensing head generally designated 18 is provided adjacent to and within the operating range of the actuator 16. The head 18 preferably includes spaced, upper and lower capacitive probes 20, 22 to be described defining therebetween a non-contacting wafer receiving gap. Vertical adjustment means, not shown, can be provided to change the dimensions of the gap defined between the spaced probes 20, 22. While any suitable chuck 12 and actuator 16 may be employed, reference may be had to the above-incorporated and commonly-assigned co-pending utility patent application Ser. No. 572,695, entitled Wafer Flatness Station, and attached hereto as an appendix, for a presently preferred embodiment thereof.

An analog signal conditioning unit 24 of known design is connected to the probes 20, 22. The unit 24 is operative to provide an analog signal representative of the thickness of the wafer.

An analog to digital (A/D) convertor 26 of known design is connected to the unit 24. The A/D convertor 26 is operative in response to the analog signal to provide a digital representation thereof.

A processor 28 having a PROM 30 and a RAM 32 associated therewith in the usual manner is operatively connected to the analog to digital convertor 26. The processor 28 is connected to the actuator 16 and to the chuck 12 via a corresponding one of a plurality of control lines respectively designated "X", "Theta", "Z", and "VAC". The processor 28 is operative in a manner to be described to produce X, Theta, Z and vacuum control signals to the assembly 12, 16.

Figure 2:
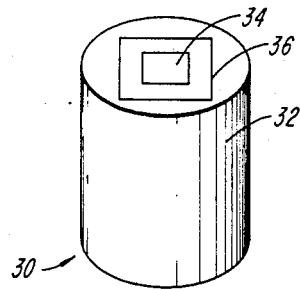
FIG. 2 is an isometric view illustrating one of the probes of the wafer profiling station embodying the object measurement system and method according to the present invention.

Referring now to FIG. 2, generally designated at 30 is an isometric view illustrating a preferred embodiment of one of the probes of the capacitive sensing head of the wafer profiling station embodying the object measurement system and method according to the present invention. The probe 30 includes a generally cylindrical body portion 32. A generally-rectangular capacitive sensing element 34 is provided on an end of the cylindrical body 32. A generally-rectangular guard 36 is provided laterally outwardly and peripherally surrounding the sensing element 34. The cross-sectional area of the sensing element 34 can have any suitable physical dimension, provided that it is not so large as to approach the radius of curvature of the edge of the wafer 14. The generally rectangular shape of the sensing element 32 is important as it allows the addition and subtraction of similarly shaped portions of the probe during controlled movement to be described. The generally rectangular guard 34 helps to preserve the orthogonality of the capacitive field lines and to minimize the undesirable effects of fringe capacitance.

Figure 3A:
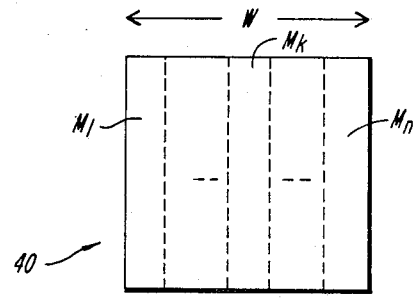
FIG. 3 illustrates FIG. 3A, in FIG. 3B and in FIG. 3C pictorial diagrams useful in illustrating the operation of the wafer profiling station embodying the object measurement system and method according to the present invention.

Referring now to FIG. 3, generally designated at 40 in FIG. 3A is an enlarged pictorial plan view of the generally rectangular capacitive sensing element useful in illustrating the operation of the wafer profiling station embodying the object measurement system and method of the present invention. The capacitive sensing element 40 has a width designated "W" that is conceptually constituted in accordance with the present invention as a plurality of "n" electrically isolated and physically adjacent capacitive strips respectively designated "$m_1$", ... "$m_k$", ... "$m_n$" that extend across the element and from end to end thereof. Each of the strips "$m_k$" has a width that is a fraction of the width "W" of the capacitive sensing element 40, and preferably, the width of each of the strips is selected to be an integral submultiple thereof. It will be readily appreciated that the capacitance of the sensing element 40 is thereby conceptually equivalent to a linear summation of the capacitances of the several strips "$m_k$".

The characteristic physical dimension of the capacitive sensing element 40 that determines its spacial resolution is its width "W". As appears below, the object measurement system and method of the instant invention is capable of providing data collection with a spatial resolution as if the capacitive sensing element 40 had an actual characteristic physical dimension that corresponds to the width of each of its conceptually constitutive strips "$m_k$".

Figure 3C:
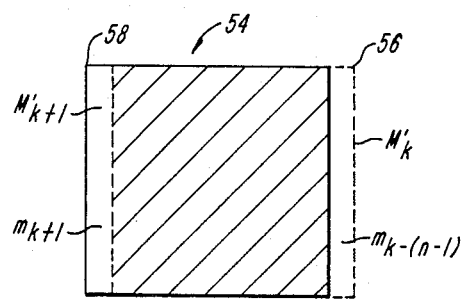
Figure 3B:
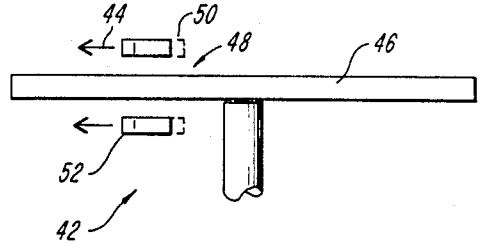

Referring now to FIG. 3B, generally designated at 42 is a schematic elevational view useful in illustrating the principle of movement that makes possible the increased spatial resolution of the wafer profiling station embodying the object measurement system and method according to the present invention. As schematically illustrated by an arrow 44, a relative motion is controllably produced between a wafer 46 to be thickness profiled and a capacitive sensing head generally designated 48 of the type described above in connection with the description of FIGS. 1 and 2. The motion either is discrete and in individual increments defining a spatial interval that is equal to the width of the strips "$m_k$" (FIG. 3A), or is continuous but with measurements being obtained at times that respectively correspond to such an increment. Although in preferred embodiment and as appears more fully below, the wafer 46 is step-driven in increments that are in integral submultiple of the width "W" of the probe 40 (FIG. 3A), for purposes of explication in FIG. 3B, the probe 48 is illustrated as being successively moved between prior positions illustrated in dashed outline 50 and subsequent positions illustrated in solid outline 52 in increments that each define a spacial interval that equals the width of each of the strips "$m_k$" (FIG. 3A), being a minor portion of the probe 40 width "W".

Referring now to FIG. 3C, general designated at 54 is an enlarged pictorial plan view of the generally rectangular capacitive sensing element useful in illustrating the operation of the wafer profiling station embodying the object measurement system and method of the present invention. The prior positions of the head 48 (FIG. 3B) and designated as 50 (FIG. 3B) are illustrated in dashed outline 56, the subsequent positions of the sensing head 48 (FIG. 3B) and designated as 52 (FIG. 3B) are illustrated in solid outline 58, for all such prior and subsequent positions as the head 48 (FIG. 3B) is moved in increments across the surface of the wafer 46. The capacitance of the sensing element for the prior positions, as illustrated in dashed outline 56 and designated "$m'_k$", is conceptually constituted as the linear sum of the capacitances of its "n" laterally adjacent strips "$m_k$", (FIG. 3A), as follows:

$$m'_k = m_k + m_{k-1} + \ldots m_{k-(n-1)}; \quad (1)$$

and the capacitance of the sensing element for the subsequent positions illustrated by the solid outline 58 and designated "$m'_{k+1}$" is conceptually constituted as the linear sum of its "n" laterally adjacent strips "$m_k$", (FIG. 3A), as follows:

$$m'_{k+1} = m_{k+1} + m_k + \ldots + m_{k+1-(-n-1)}; \quad (2)$$

where the index in equations one and two designates the positions of the increments of relative movement between the capacitive sensing head 48 (FIG. 3B) and the wafer 46 (FIG. 3B).

The measurements provided by the capacitive sensing head 48 designated "$m'_k$" for each index represent the thickness of the wafer 46 (FIG. 3B) with a resolution that is determined by the characteristic physical dimension "W" of the sensing element 40 (FIG. 2) in the direction of probe motion. Since each of these capacitance measurements as above described are conceptually constituted in accordance with the present invention as a series of electrically isolated and adjacent strips, it will be readily appreciated that the successive difference therebetween represents a corresponding difference between its conceptually constitutive electrically isolated and adjacent strips, as follows:

$$m'_{k+1} - m'_k = m_{k+1} - m_{k-(n-1)}. \quad (3)$$

Since the measurements for the intermediate constitutive strips cancel out as illustrated in diagonal lines in FIG. 3C, equation (3) thus expresses that the difference ($m'_{k-1} - m'_k$) between the successive measurements produced by the actual probe is equal to the difference ($m_{k+1} - m_{k-(n-1)}$) between the measurement for the conceptual strip located at the leading edge of probe movement designated "$m_{k+1}$" minus the measurement for the conceptual strip located just behind the trailing edge of probe movement designated "$m_{k-(n-1)}$".

The movement of the probe is increments equal to the strip width provides data with a spacial resolution as described above that is determined by the width of the probe for each increment of movement. The data representative of the difference therebetween for each prior and subsequent increment of motion as described above is representative of the difference between individual ones of the pairs of leading edge located and just after trailing edge located conceptually constitutive strips for corresponding increments of movement.

To digitally filter the measured data to provide processed data representative of the thickness of the wafer as if produced by a probe having a spatial resolution determined only by the strip width of the individual constitutive electrically isolated and adjacent strips "$m_k$", first define a variable "$m''_k$" representative of the difference between capacitive measurements taken successively in increments of a strip width, as follows:

$$m''_k = m'_k - m'_{k-1}. \quad (4)$$

Then define a variable "$o_k$" recursively for each index position as the sum of each of the "$m''_k$"'s with its value for a one-probe-width lag, as follows:

$$o_k = m''_k + r o_{k-n}. \quad (5)$$

The variable "r" is a constant selected to be slightly less than one (1) to stabilize the loop. After a few iterations, the left hand side of equation (5) becomes equal to the right hand side of equation (5), and it can be shown that thereafter the "$o_k$" 's provide data for each index position of incremental motion having a spatial resolution as if the corresponding conceptually constitutive strip "$m_k$" were employed.

Referring now to FIG. 4A, generally shown at 59 is a flow chart useful in explaining the presently preferred processing steps of the wafer profiling station embodying the object measurement system and method of the present invention.

As shown by a block 60, the processor 28 (FIG. 1) is operative to send a vacuum control signal to the vacuum chuck 12 (FIG. 1) to suck-down the wafer 14 (FIG. 1) at its centroid.

As shown by a block 62, the processor 28 is then operative to send an X control signal to the X, Theta, and Z actuator 16 (FIG. 1) to move the wafer 14 into the capacitive sensing head 18 (FIG. 1) to that position where its outer circumferential edge extends beyond the left-hand outside edge thereof preferably by the width of one conceptually constitutive strip.

As shown by the block 62, the processor is then operative to send a Theta control signal to the actuator 16 to spin the wafer 14 incrementally in steps selected to bring successive ones of a plurality of preselected points thereof located on that circumference of the wafer within the sensing head 18.

As shown by blocks 64, 66, the thickness data corresponding thereto is stored in a data table in the RAM 32 (FIG. 1) at an address location thereof that corresponds to the radial and angular coordinate of each of the individual points.

As shown by the block 62, the processor 28 is then operative to step the wafer 14 by one increment of motion radially outwardly to the left of the sensing head 18 by applying an X control signal to the actuator 16, and the processor is then operative to send a Theta control signal to the actuator 16 to spin the wafer at the radially incremented position to incrementally bring successive ones of a plurality of preselected points located on that circumference of the wafer within the capacitive sensing head 18.

As shown by the blocks 64, 66, the corresponding data is stored in the data table at an address location thereof that corresponds to the radial and angular coordinates of each of the points on this ring of the wafer.

Referring now briefly to FIG. 5, generally designated at 67 is a pictoral diagram useful in illustrating the preferred data collection pattern of the wafer profiling station embodying the object measurement system and method according to the present invention. The wafer is illustrated in sold outline 68, and a predetermined plurality of circumferential rings located adjacent the edge of the wafer 68 are generally designated at 70. The rings 70 are spaced apart by a distance that corresponds to the width of the conceptually constitutive strips of the sensing element of the probe, and the preselected points thereof that are brought into the sensing head are designed as solid dots located on each of the rings.

As shown by the blocks 64, 66, the processor is operative to repeat the above described process until all of the points located on each of the several rings 70 have been brought into the capacative sensing head and the corresponding data is stored in the data table as a function of the motor position.

After all of the data is collected for the points located on the closely-spaced rings 70, the processor is operative to step and to spin the wafer in larger radial increments to collect data for corresponding ones of a plurality of points located on circumferential rings generally designated 72 in FIG. 5 defined for regions of the wafer remote from its edge.

Returning to FIG. 4A and as shown by a block 74, after all the data for the points on the rings 70, 72 is collected, the processor is operative to call a "compute edge thickness" subroutine to be described to compute the edge thickness.

As shown by a block 76, after the computation is completed, the processor is operative to store the processed data representative of the thickness of those points located on the rings 70 adjacent the wafer edge.

As shown by a block 78, the processor is then operative to compute a flatness profile of the wafer, the resulting data is stored as shown by a block 80, and the above process is repeated on the same or another wafer. Although any suitable means can be employed therefor, it will be appreciated that the flatness data can with advantage be compiled using the computational algorithm disclosed in the above-identified and incorporated copending utility patent application entitled Wafer Flatness Station.

Referring now to FIG. 4B, generally designated at 82 is a flow chart illustrating the presently preferred processing steps of the "compute edge thickness" subroutine.

As shown by a block 84, the processor is operative to read the thickness data for the plural edge rings 70 from the data table in memory.

In the case of the exemplary two probe capacitive measurement of thickness of an element centered between the probes, the relationship between capacitance, C, and measured thickness, t, is governed by the expression $C = (2K) / (D-t)$, where D is the total separation between the two probes, and K is a constant. While the capacitance varies linearly with the characteristic physical dimension of the probe, the thickness "t" has an inverse relationship to capacitance. For processing to achieve a spatial resolution which is a small fraction of the probes characteristic physical dimension, the thickness parameter is converted to a variable which varies linearly with the characteristic physical dimension, namely capacitance in the exemplary embodiment. It should be noted that for probes configured to output a variable that directly sums with spatial area, the conversion thereto would not be necessary.

As shown by a block 86, the processor is then operative to convert the data to capacitance by inverting the data in the data table.

As shown by a block 88, the processor is then operative to compute the "$m''_k$"s for those data sets in the data table having a common angular coordinate but successive radial coordinates as illustrated in FIG. 5 by arrows 90, for all such data sets disposed at corresponding coordinates circumferentially around the wafer 68.

As shown by a block 92, the processor is then operative to compute the "$o_k$"s therefrom for the data points of each of the data sets.

As shown by a block 94, the processor is then operative to convert the resulting data back to thickness by inverting the data in the data matrix in memory and processing is returned to the step 76 of FIG. 4A.

Figure 6A:
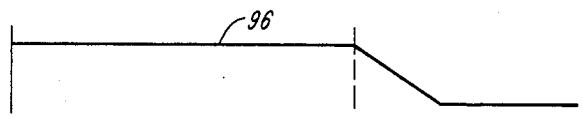
FIG. 6 illustrates in FIGS. 6A-6C graphs useful in illustrating the operation of the wafer profiling station embodying the object measurement system and method according to the present invention.
Figure 6B:
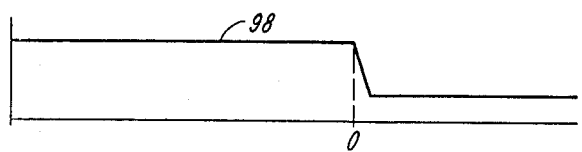
Figure 6C:
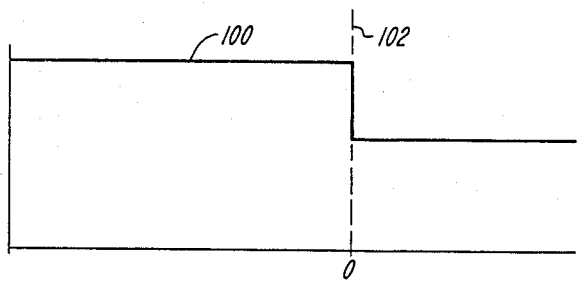

Referring now to FIG. 6, there is shown graphs useful in illustrating the improved spatial resolution that is characteristic of the operation of the wafer profiling station embodying the object measurement system and method of the present invention. A graph 96 for a probe having a characteristic physical dimension "W" is illustrated in FIG. 6A, and a graph 98 for a conceptual probe that corresponds to one of the actual probes conceptually constitutive strips and having a length that corresponds to a preselected integral submultiple or a minor portion of the width "W" of the probe is illustrated in FIG. 6B. The graphs 96, 98 are plotted in arbitary units with the ordinate representing the output of the probes corresponding to their linearly additive properties, namely capacitance in the exemplary embodiment. A graph 100 that corresponds to the actual profile of the object or wafer is illustrated in FIG. 6C, with the edge of the wafer being represented as the "step" thereof. A vertical line 102 delimits the boundary defined by the edge of the wafer being tested. The abscissa of the graphs 96, 98, 100 represented the distance between the leading edge of the probe and the edge of the wafer.

The output signal of the probe is linear, and therefor predicable, for regions of the wafer remote from its edge by at least a probe width as shown by the flat portions of the graph 96. The points of the wafer, however, located within a probe width of its edge, for which the probe produces unreliable data, is illustrated by the sloping portion of the graph 96. The conceptual probe of the object measurement system and method of the present invention makes possible a substantially improved spatial resolution and acts to effectively recapture the data for points located well within a probe width of the edge of the wafer as illustrated by the sloping portion of the graph 98.

It will be thus appreciated that while the present invention has exemplary utility with the disclosed wafer profiling system, it has utility in many other applications where increased spatial resolution is important or desirable and it accordingly is not to be limited except by the scope of the appended claims.

What is claimed is:

1. A system for measuring a parameter associated with an object, comprising:
   a probe, having a characteristic physical dimension, for providing successive first signals representative of the parameter wherein the parameter has a comparatively-large spatial resolution that is determined by the characteristic physical dimension of the probe;
   means for moving the probe and the object relative to each other controllably in predetermined intervals at least some of which define a preselected spatial dimension selected to be a minority portion of the characteristic physical dimension of the probe; and
   means coupled to the probe and responsive to the successive first signals as produced at corresponding ones of said predetermined intervals for providing a second signal representative of the parameter associated with the object with a comparatively-small spatial resolution that is determined by the preselected spatial dimension defined by said intervals selected to be a minority portion of the characteristic physical dimension of the probe.

2. The invention of claim 1, wherein said probe includes a capacitive probe having a substantially-rectangular sensing element.

3. The invention of claim 2, further including a substantially-rectangular guard surrounding said substantially-rectangular sensing element.

4. The invention of claim 1, wherein said moving means includes means for receiving the object, and means coupled to the receiving means for translating and rotating the object.

5. The invention of claim 4, wherein said object is a semiconductor wafer.

6. The invention of claim 5, wherein said moving and receiving means includes an X, Theta, Z, and vacuum actuator assembly.

7. The invention of claim 1, wherein said moving means is operative to move said object in discrete movements.

8. The invention of claim 1, wherein said second signal providing means includes a processor operative to digitally filter said successive first signals to provide said second signal.

9. The invention of claim 8, wherein said moving means is operative to continuously move said object and includes means to produce said successive first signals at time intervals that correspond to increments that individually are a fraction of the characteristic physical dimension of the probe.

10. The invention of claim 8, wherein said processor is operative to digitally filter said successive first signals by computing the difference between said first signal taken at successive ones of said predetermined intervals to provide corresponding difference signals therebetween; and by recursively computing the difference between said difference signals at intervals that correspond to the characteristic physical dimension of the probe.

11. The invention of claim 1, wherein said preselected dimension is selected to be an integral submultiple fraction of said characteristic physical dimension of the probe.

12. A method for measuring a preselected characteristic associated with an object with a probe having a characteristic physical dimension with a spatial resolution that is determined by its characteristic physical dimension in such a way as to improve the spatial resolution of the probe, comprising the steps of:
   moving the probe and the object relative to each other in such a way as to define increments of motion that individually define a preselected dimension that is selected to be a minority portion of the characteristic physical dimension of the probe;
   obtaining data having a spatial resolution determined by the characteristic physical dimension of the probe representative of the preselected characteristic associated with the object at preselected points of the object selected to correspond to the increments of relative motion between the probe and the object; and
   controllably combining said data to provide second data representative of the preselected characteristic associated with the object with a spatial resolution that depends only on the dimension of the increment of relative motion between the probe and the object.

13. The invention of claim 12, wherein said moving step includes the steps of moving the object and probe continuously, and wherein said obtaining step includes the step of obtaining the output of the probe at times that correspond to the increments of motion.

14. The invention of claim 12, wherein said moving step includes the step of moving the object and probe discretely in said increments.

15. The invention of claim 12, wherein each of the points on the object have a spacial location, and further including the step of storing said data in memory at address locations thereof that respectively correspond to the spatial location of the points on the object.

16. The invention of claim 15, wherein said combining step includes the steps of reading said data from memory, and the step digitally filtering said data to provided said second data.

17. A wafer profiling station for profiling the thickness of a semiconductor wafer, comprising:
a sensing head having a probe defining a characteristic physical dimension;
means disposed relative to the wafer for moving preselected points of the wafer selected to lie on a spatial locus of the wafer that defines between predetermined ones thereof a spatial interval that is a fraction of the characteristic physical dimension of the probe within the sensing head;
means coupled to said sensing head and responsive to said moving means for storing successive first data respectively representative of the thickness of the wafer at each of said preselected points having a spatial resolution that is determined by the characteristic physical dimension of said probe; and
means coupled to said storing means and responsive to said predetermined ones of said preselected points of said wafer for providing successive second data representative of the thickness of said preselected points with a spatial resolution that is determined by said minority portion of said characteristic physical dimension of said probe.

18. The invention of claim 17, wherein said spatial locus includes plural concentric rings located adjacent the edge of said wafer and spaced apart by a radial distance that corresponds to said minority portion.

19. The invention of claim 17, wherein said minority portion is selected to be an integral submultiple of said characteristic physical dimension.

20. The invention of claim 19, wherein said characteristic physical dimension is the width of said probe.

21. An object measurement system, comprising:
first means including a probe having a characteristic physical dimension for providing first data representative of a preselected characteristic associated with an object to be measured with a spatial resolution that is determined by its characteristic physical dimension; and
second means coupled to said probe and responsive to said first data for providing second data representative of the preselected characteristic of said object with a spatial resolution that is determined as a minority portion of the characteristic physical dimension of the probe.

22. The invention of claim 21, wherein said first means includes means for imparting a relative motion between said prove and said object in such a way that said first data is measured in increments that are a minority portion of said characteristic physical dimension.

23. The invention of claim 22, wherein said minority portion is an integral sub-multiple of said characteristic physical dimension.

24. The invention of claim 21, wherein said second means includes a processor operative to digitally filter said successive first data.

25. The invention of claim 21, wherein said probe has a generally-rectangular geometry.

26. The invention of claim 25, further including a generally-rectangular guard surrounding said generally-rectangular probe.

27. A measurement system, comprising:
a sensor operative to sense a parameter associated with the whole of an area of a surface of an object;
means for providing relative motion between the sensor and object in steps which change the area along said surface by a minority portion thereof between steps; and
means for processing a series of sensed parameters corresponding to a sequence of the steps to provide a plurality of output parameters each corresponding to a minority portion of the area sensed.

* * * * *

UNITED STATES PATENT AND TRADEMARK OFFICE
CERTIFICATE OF CORRECTION

PATENT NO. : 4,849,916

DATED : July 18, 1989

INVENTOR(S) : Robert C. Abbe; Neil H. Judell; Noel S. Poduje

It is certified that error appears in the above-identified patent and that said Letters Patent is hereby corrected as shown below:

In Column 1, line 54, "characteristicly" should read --characteristically--.

In Column 3, line 50, "wafer," should read --wafers,--.

In Column 5, line 32, "are in" should read --are an--.

In Column 6, line 24, "$(M'_{k-1} - m'_k)$" should read --$(m'_{k+1} - m'_k)$--.

In Column 6, line 31, "probe is" should read --probe in--.

In Column 7, line 45, "sold" should read --solid--.

In Column 9, line 8, "represented" should read --represents---.

In Column 9, line 12, "therefor" should read --therefore--.

In Column 10, line 55, "output of the probe" should read --data--.

In Column 10, line 61, "spacial" should read --spatial--.

In Column 10, line 67, "step digitally" should read --step of digitally--.

In Column 10, line 68, "provided" should read --provide--.

UNITED STATES PATENT AND TRADEMARK OFFICE
CERTIFICATE OF CORRECTION

PATENT NO. : 4,849,916

DATED : July 18, 1989

INVENTOR(S) : Robert C. Abbe; Neil H. Judell; Noel S. Poduje

It is certified that error appears in the above-identified patent and that said Letters Patent is hereby corrected as shown below:

In Column 12, line 15, "sub-multiple" should read --submultiple--.

Signed and Sealed this

Third Day of November, 1992

Attest:

DOUGLAS B. COMER

*Attesting Officer*   Acting Commissioner of Patents and Trademarks